P. E. DOOLITTLE.
PNEUMATIC TIRE.
APPLICATION FILED NOV. 3, 1906.
990,965.
Patented May 2, 1911.
2 SHEETS—SHEET 1.
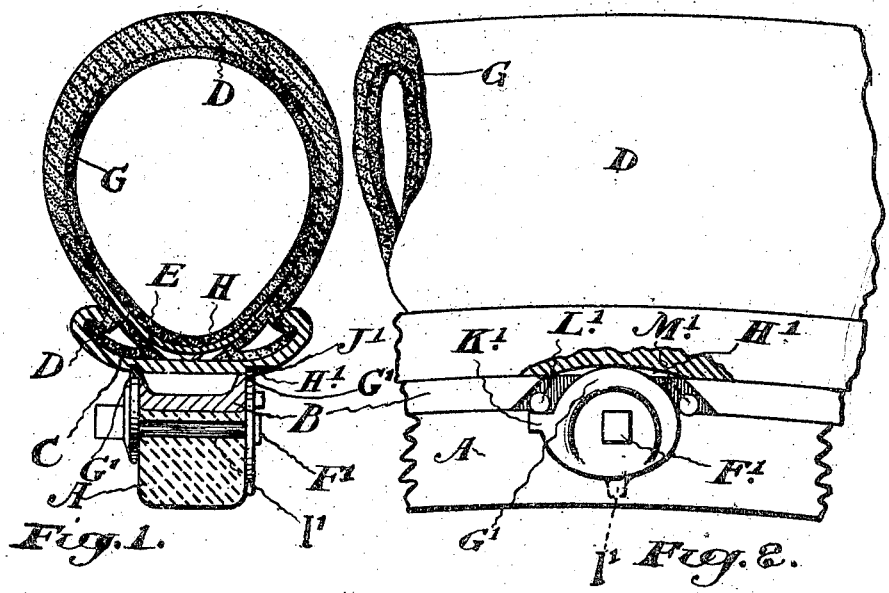
Fig. 1.   Fig. 2.
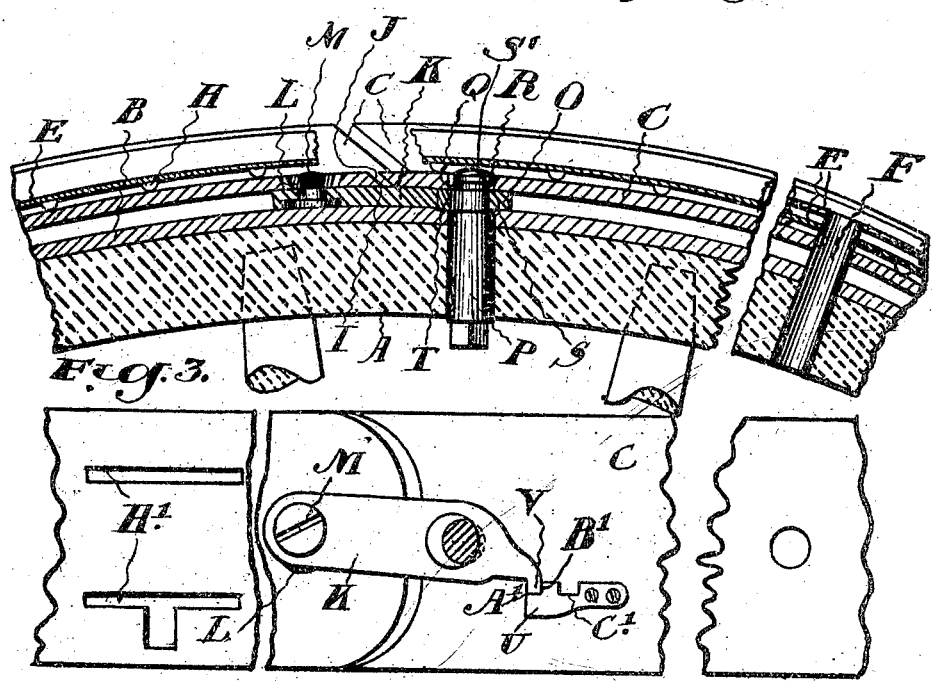
Fig. 3.
Fig. 4.
WITNESSES.
INVENTOR.
P.E. Doolittle.
BY
ATTORNEYS

UNITED STATES PATENT OFFICE.

PERRY E. DOOLITTLE, OF TORONTO, ONTARIO, CANADA, ASSIGNOR, BY MESNE ASSIGNMENTS, TO DOOLITTLE RIM CO., LTD.

PNEUMATIC TIRE.

990,965.

Specification of Letters Patent. Patented May 2, 1911.

Application filed November 3, 1906. Serial No. 341,848.

*To all whom it may concern:*

Be it known that I, PERRY E. DOOLITTLE, of the city of Toronto, in the Province of Ontario, Canada, doctor of medicine, have invented certain new and useful Improvements in Pneumatic Tires, of which the following is a specification.

This invention relates to improvements on the rim shown and described in my prior application Serial No. 331,271, filed August 20, 1906. In the tire shown in that application the base of the tire cover was suitably held in a divided annular metal band provided with means whereby it might be expanded, and held expanded or contracted and held on the felly; and my object in the present invention is to devise strong, simple and quickly operated means for contracting and expanding the band, and for holding it on the rim. In my present construction I aim to have no loose parts and to so arrange that all movements of the parts in changing tires are limited by stops in either direction.

In carrying out my invention I connect to one end of the divided band a pivoted link. To the other end of the link is journaled an eccentric formed on or secured to a stem extending radially through to the inside of the felly where it is provided with a head adapted for engagement by a wrench. A cylindrical pin concentric with the stem engages a similar hole in the other end of the band. Thus by rotating the stem the eccentric may be caused to operate the link to contract or expand the band.

My invention further relates to means for circumferentially adjusting the pivoted attachment between the link and the end of the band with which it is engaged, and to the means provided for holding the band from lateral displacement after it has been placed in position on the felly, substantially as hereinafter more specifically described, and then definitely claimed.

Figure 5:
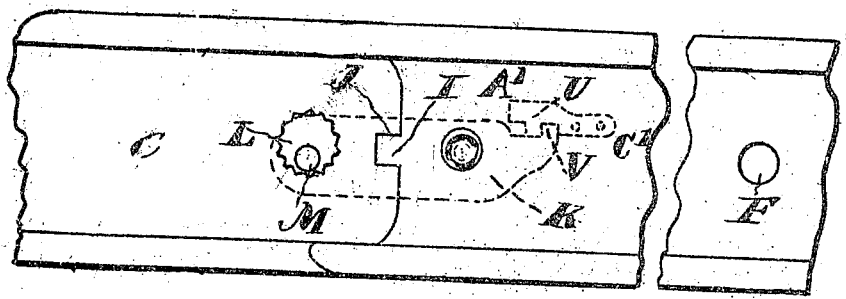
Figure 6:
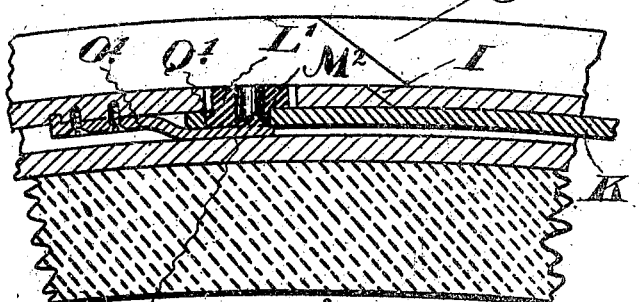
Figure 7:
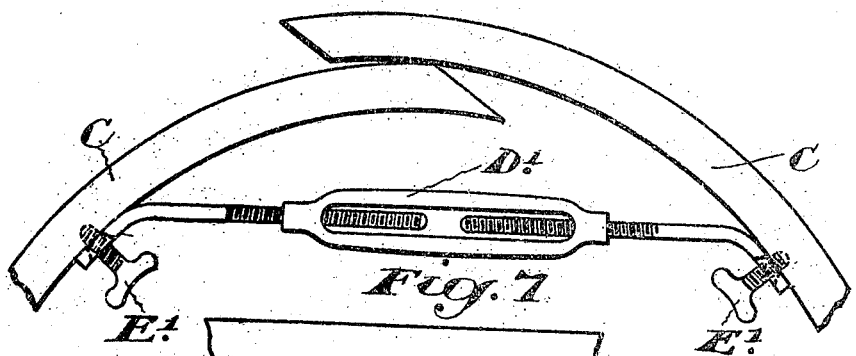
Figure 8:
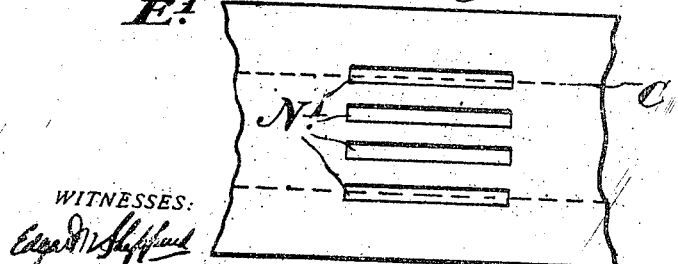

Figure 1 is a cross section through a felly, rim and tire embodying my invention. Fig. 2 is a side elevation of a portion of the same. Fig. 3 is a longitudinal section of a portion of the same. Fig. 4 is a plan view of the under side of the portion of the band shown in Fig. 3. Fig. 5 is a plan view of the outer surface of the same parts. Fig. 6 is a longitudinal section showing a modification of the means employed for circumferentially adjusting the link connecting the ends of the band. Fig. 7 is a view in side elevation showing the method of contracting the band to facilitate the engagement of the tire cover therewith. Fig. 8 is a plan view of the under side of the band showing grooves for use in prying off the band.

In the drawings like letters of reference indicate corresponding parts in the different figures.

A is a wooden felly, to which is connected a metal rim B, preferably grooved or recessed circumferentially, as shown.

C is an annular band shaped in cross section, as shown in Fig. 1, to receive the edges of a tire cover D of the well-known clencher pattern.

Engaging the inner sides of the cover edges is a band E, whose ends overlap and are held in position by the valve stem F, which passes through holes in the ends thereof. This band serves to effectually hold down the edges of the cover, and provides a good seat for the inner side of the inner tube G. In order to hold this band in position a little away from the surface of the band C it is preferably provided with studs H, which are preferably of rubber or other resilient material to permit of a slight accommodation in the fit of the band. As this band is thus held up from the band C it is an easy matter to place the edges of the outer cover in position.

The band C has a transverse division therein cut on a bevel, as shown, to enable one end of the band to be readily lapped over the other when the band is constructed as hereinafter described. A tongue I extends from one end into the recess J formed in the other end, and serves to hold the ends from lateral displacement.

K is a link pivotally connected with one end of the band. This pivot is preferably adjustable circumferentially of the band. In Figs. 3 and 5 I show one means of effecting this adjustment. A toothed disk L is fitted into a similarly shaped hole in the band C. Eccentric to the toothed disk L is a hole for a stud M, which stud is screwed into the hole, and on it is pivoted the link K. The head of the stud is preferably counter-sunk in the link, and is provided with a slot for a screw driver, or other means whereby it may be screwed in or out. The disk L, it will be noticed, is shaped as the frustum of a cone, and hence is securely held in position when the stud carrying the link is screwed up tight. By loosening this stud and removing the disk, and reëngaging the disk with the band in a new position, a fine adjustment may be given the pivot of the link circumferentially of the band. A certain amount of lateral adjustment accompanies this circumferential adjustment, but this has no material ill effect.

In Fig. 6 I show a modification of the adjusting means. The disk $L^1$ is shaped as a portion of a cylinder, and has an eccentric $M^2$ formed thereon with which the link K is engaged. $O^1$ is a strap secured to the band C, and provided with a stud $P^1$ passing through a central hole in the disk $L^1$. In this form the toothed disk $L^1$ is adjusted by removing the strap $O^1$, when it is easily removed and turned to the required position in the band. The strap $O^1$ with its stud securely holds it in position, and the strain on the link K is withstood both by the strap and by the direct engagement of the disk with the band. The other end of the link K shown in the other figures of the drawing, is journaled on the eccentric O. This eccentric is formed on the stem P, which extends radially through the felly A, and is provided at its inner end with a head adapted for engagement by a suitable wrench. (See Fig. 3). Concentric with the stem P is a cylindrical pin Q, which enters a hole formed in the other end of the band C. On the head of the pin is formed an eccentric flange R, which engages a lip $S^1$ at the bottom of the recess S, counter-sunk in the bottom of the band. (See Figs. 3, 4, and 5). At one side an opening T, of the same size as the eccentric flange, is formed clear through the band. Thus when the eccentric flange is in alinement with this recess the pin Q may be withdrawn from the band, but when the stem P and pin Q are turned in any other position the eccentric flange R will lock the pin and stem to the band. Thus when the parts are all in the position shown in Fig. 3, in case a tire becomes deflated when running at a high rate of speed, the end of the band cannot under any circumstances be thrown outwardly under the influence of centrifugal force, or any other force tending to strip it from the felly.

Secured to the under side of the band C adjacent to the eccentric is a projecting stop piece U, shaped as shown.

A finger V, projecting laterally somewhat, is formed on the end of the link K. When the eccentric is thrown to the position shown in Fig. 4, thus expanding the rim to the limit of the throw of the eccentric, the finger V engages the bottom $A^1$ of a notch formed in the part U. This limits the throw of the eccentric when it is on, or only slightly past the center, when the eccentric has been turned to expand the band. The finger also engages the end $B^1$ of the same notch. The link thus abutting on the stop piece U enables the link to hold the band expanded after it has been withdrawn from engagement with the eccentric, as hereinafter described. A second notch is formed in the metal stop piece U, and with the bottom $C^1$ of this notch the finger V engages when the link has been moved to the limit of the throw of the eccentric in the other direction (see Fig. 5). Thus it will be seen that an operator has to exercise no judgment or thought in operating the eccentric as it is merely necessary for him to turn the stem P to the limit of its possible motion in either direction to either expand or contract the band C to its possible limits.

The operation of the device is substantially as follows:—In placing a tire in position on the band C it is preferably considerably contracted, as shown in Fig. 7. A turnbuckle $D^1$ may be employed for this purpose secured at each end to the rim by thumb screws $E^1$, or in any other suitable manner. When the band C is thus contracted it is a very simple matter to place the cover, the band E and the inner tube in position, when the band may be allowed to assume its original position with the beveled ends in alinement with one another. The rim may easily be expanded somewhat, and the link K engaged with the stop piece U, as shown in Fig. 4. The band in this position is slightly larger in circumference than the rim B of the felly, and the band can then easily be placed in position on the felly. The operator will first make sure that the eccentric O is in the proper position to enter the hole therefor in the link. The openings in the band for the pin Q and the flange R are also then in proper position for the pin Q and the flange R to pass through them. The stem P is preferably adjacent to the valve stem F, as shown, so that when the valve stem has been pushed through the hole in the felly, and the band and link engaged with the pin and eccentric, as described, no difficulty is experienced in pressing the diametrically opposite edge of the band in position on the felly. When the band is in position the stem is revolved a half revolution until it engages the stop piece, as shown in Fig. 5, when the band will be found to be contracted closely on the rim. The inner tube may now be inflated, or, if desired, it may have been inflated before the band is placed in position on the felly. If it be desired to remove the tire from the felly it is merely necessary to throw the stem P back to the position shown in Fig. 4, when the band may be slipped from the rim, the link engaging the metal stop piece U holding the band expanded during and after removal. It is necessary, however, to provide against lateral displacement of the band and I therefore journal transversely of the felly one or more bolts F¹. At one or both ends of each bolt I provide an eccentric flange G¹. By turning the bolt this flange, or flanges, may be brought into engagement circumferentially with grooves or recesses H¹ formed on the under side of the band C. A secure lock is thus provided.

As some difficulty might be experienced in bringing the recesses and flanges into proper alinement I provide at one end of the bolt a pin I¹ diametrically opposite the middle of the eccentric flange G¹. A lateral groove J¹ is cut in the under side of the band leading into that groove H¹ which is at the inner side of the felly of the wheel when the wheel is in position on a car. When the pin I is turned outermost it will be in a position to enter the groove J¹ as the band C is pushed on to the felly, and it will therefore offer no obstacle to the band being placed in position until the side of the recess H¹ engages it. This is a sign that the band C has been pushed on to the felly sufficiently far to bring the recesses H¹ in alinement with the flanges G¹, and indeed provides an effective stop insuring the band being in the correct position on the felly. The bolts may now be turned and the flanges engaged with the recesses, as already described. The opposite end of each bolt to that carrying the pin I¹ is provided with a pin K¹ adapted to engage either of the stops L¹ and M¹. These stops limit the rotary movement of the bolt and stop it, with either the pin I¹ or the eccentric flange G¹ in the outermost position, thus relieving the operator of the necessity of using judgment or consideration in turning the bolts to their proper positions.

To aid in prying the band C from the rim if rusted in place during long use, I form, wherever necessary, a plurality of circumferential grooves N¹ in the under side of the band C. The outer grooves N¹, when the band is in place on the felly, will be outside the rim of the latter, and the inner grooves will be entirely covered by the rim, the dotted lines in Fig. 8 showing the position of the edges of the rim of the felly. Thus moisture and dirt are effectively excluded from the inner grooves. These grooves may be used one after the other as points of engagement for a tool to gradually pry off the rim.

The advantages of the fundamental construction of my tire are now well recognized. It will be seen, however, from the construction described that I have devised exceedingly strong and effective means for engaging and disengaging the expansible band from the rim, and that the construction lends itself to these operations being performed in the shortest possible time and with the greatest possible certainty.

What I claim as my invention is:

1. In a wheel rim the combination of a felly having a substantially flush faced outer periphery, an annular rim having a substantially flush faced inner periphery and fitting closely on the felly, an annular band fitting over the aforesaid rim, the said band being divided transversely and adapted for engagement by a tire cover; a link pivoted at one end to one end of the band; and a pin journaled at the other end of the band; an eccentric on the pin on which the other end of the link is journaled, the said eccentric having a throw sufficient to slightly expand the band and adapted to hold it expanded against tire pressure, substantially as described.

2. In a wheel rim the combination of a felly having a substantially flush faced outer periphery, an annular rim having a substantially flush faced inner periphery and fitting closely on the felly, an annular band fitting over the aforesaid rim, the said band being divided transversely and adapted for engagement by a tire cover; a link pivoted at one end to one end of the band; a pin journaled at the other end of the band; an eccentric on the pin on which the other end of the link is journaled, the said eccentric having a throw sufficient to slightly expand the band and adapted to hold it expanded against tire pressure, and a stem having an operative connection with the eccentric extending radially through the felly, substantially as described.

3. In a wheel rim the combination of a felly having a substantially flush faced outer periphery, an annular rim having a substantially flash faced inner periphery and fitting closely to the felly, an annular band fitting over the aforesaid rim, the said band being divided transversely and adapted for engagement by a tire cover; a link pivoted at one end to one end of the band; a stem journaled radially therein; a concentric cylindrical projection thereon, the other end of the band having a hole formed therein to engage the projection; and an eccentric on the stem on which the other end of the link is journaled; the said eccentric having a throw sufficient to slightly expand the band and adapted to hold it expanded against tire pressure, substantially as described.

4. In a wheel rim the combination of an annular band divided transversely, and adapted for engagement by a tire cover; a link pivoted at one end to one end of the band; a felly; a stem journaled radially therein; a concentric cylindrical projection thereon, the other end of the band having a hole formed therein to engage the projection; an eccentric on the stem on which the other end of the link is journaled; and a stop on the band adjacent to the eccentric with which the link is adapted to engage to resist contraction of the band when the latter is expanded and disengaged from the eccentric, substantially as described.

5. In a wheel rim the combination of an annular band divided transversely, and adapted for engagement by a tire cover; a disk rotarily adjustable on one end of the band; an eccentric pivot thereon; a link pivoted at one end on said pivot; a pin journaled in the other end of the band; and an eccentric on the pin on which the other end of the link is journaled, substantially as described.

6. In a wheel rim the combination of an annular band divided transversely, and adapted for engagement by a tire cover; a link pivoted at one end to one end of the band; a pin journaled at the other end of the band; an eccentric on the pin on which the other end of the link is journaled; and stops adapted to limit the movement of the eccentric at the limit of its throw in either direction circumferentially of the tire, substantially as described.

7. In a wheel rim the combination of an annular band divided transversely, and adapted for engagement by a tire cover; a link pivoted at one end to one end of the band; a stem; a concentric cylindrical projection thereon, the other end of the band having a hole formed therein to engage the projection; an eccentric on the stem on which the other end of the link is journaled; stops adapted to limit the movement of the eccentric at the limit of its throw in either direction circumferentially of the tire; and a stop on the band adjacent to the eccentric with which the link is adapted to engage to resist contraction of the band when the latter is expanded and disengaged from the eccentric, substantially as described.

8. In a wheel rim the combination of an annular band divided transversely, and adapted for engagement by a tire cover; a link pivoted at one end to one end of the band; a stem; a concentric cylindrical projection thereon, the other end of the band having a hole formed therein to engage the projection; an eccentric on the stem on which the other end of the link is journaled; and stops adapted to limit the movement of the eccentric at the limit of its throw in either direction circumferentially of the tire, substantially as described.

9. In a wheel rim the combination of a felly; a band shaped for engagement by a resilient tire and adapted to be slipped laterally upon the felly; a bolt journaled transversely in the felly and having an eccentric flange at one end, the band having a circumferential groove formed therein into engagement with which the said flange may be turned; a pin on the bolt; and stops on the felly, the said pin engaging one of the stops when the first mentioned pin is in line with the transverse groove, and the other when the flange is in engagement with the circumferential groove, substantially as described.

10. In a wheel rim the combination of an annular metal band or rim; a tire cover having edges with which the rim is adapted to engage to hold the cover in place; an inner metal band within the cover engaging the edges thereof; and studs on the inner band holding it away from the rim, substantially as described.

Toronto, Ont., 17th October, 1906.

PERRY E. DOOLITTLE.

Signed in the presence of—
EDGAR W. SHEPPARD,
F. McKENDRICK.